United States Patent [19]

Zimmermann et al.

[11] 4,036,606
[45] July 19, 1977

[54] METHOD OF CLEANING GASES AND APPARATUS THEREFOR

[75] Inventors: Fritz Zimmermann, Essen-Steele; Arthur Lenk, Essen-Borbeck, both of Germany

[73] Assignee: STEAG Aktiengesellschaft, Essen, Germany

[21] Appl. No.: 608,930

[22] Filed: Aug. 29, 1975

[30] Foreign Application Priority Data

Sept. 19, 1974 Germany .............................. 2444819

[51] Int. Cl.² ...................... C10J 3/68; B01D 47/06
[52] U.S. Cl. ......................................... 48/77; 48/210; 55/85; 55/89; 55/92; 55/227; 55/228; 55/229; 55/421; 210/73 R; 210/195 R; 210/257 R; 210/259; 210/512 M
[58] Field of Search ...................... 55/85, 89, 92, 228, 55/229, 238, 345, 346, 349, 421, 227; 48/206, 77, 210; 210/73 R, 73 W, 74, 195 R, 195 M, 195 , 259, 257 R, 257 M, 512 M, 196

[56] References Cited

U.S. PATENT DOCUMENTS

| 2,142,406 | 1/1939 | Nonhebel et al. | 55/228 |
|---|---|---|---|
| 2,754,968 | 7/1956 | Vegter et al. | 210/75 R |
| 2,886,287 | 5/1959 | Croley | 210/195 R |
| 2,919,898 | 1/1960 | Marwil et al. | 210/195 R |
| 3,148,042 | 9/1964 | Harnisch et al. | 55/229 |
| 3,265,212 | 8/1966 | Bonsall, Jr. | 210/59 |
| 3,444,077 | 5/1969 | Finch | 210/73 W |
| 3,481,834 | 12/1969 | Squires | 48/206 |
| 3,715,195 | 2/1973 | Tassoney et al. | 48/206 |
| 3,733,788 | 5/1973 | Crowley | 55/228 |
| 3,764,008 | 10/1973 | Darley et al. | 210/73 W |
| 3,768,234 | 10/1973 | Hardison | 55/227 |
| 3,844,943 | 10/1974 | Duval | 210/259 |

FOREIGN PATENT DOCUMENTS

| 507,912 | 1/1952 | Belgium | 210/259 |
|---|---|---|---|
| 878,043 | 4/1953 | Germany | 210/259 |

Primary Examiner—Frank W. Lutter
Assistant Examiner—David L. Lacey
Attorney, Agent, or Firm—Malcolm W. Fraser

[57] ABSTRACT

Method and apparatus for cleaning gases, especially those generated by the pressurized gasification of coal, to remove impurities therefrom, especially tar, dust and salts, in which the gases are washed with a liquid, preferably water, in a scrubbing unit and the wash liquid is cleaned to yield a major clean liquid stream which is recycled by a circulating means to the scrubbing unit and a minor impurities concentrate stream from which the impurities are removed, in a separator unit. Preferably the wash liquid is cleaned using a plurality of hydrocyclones which may be arranged in series or in parallel. Optionally the liquid recovered from the impurities concentrate stream is returned to the scrubbing unit, although if the quantity of this liquid is equal to the quantity of liquid required for the de-salting of the wash liquid, no recovered liquid is returned to the scrubbing unit.

4 Claims, 1 Drawing Figure

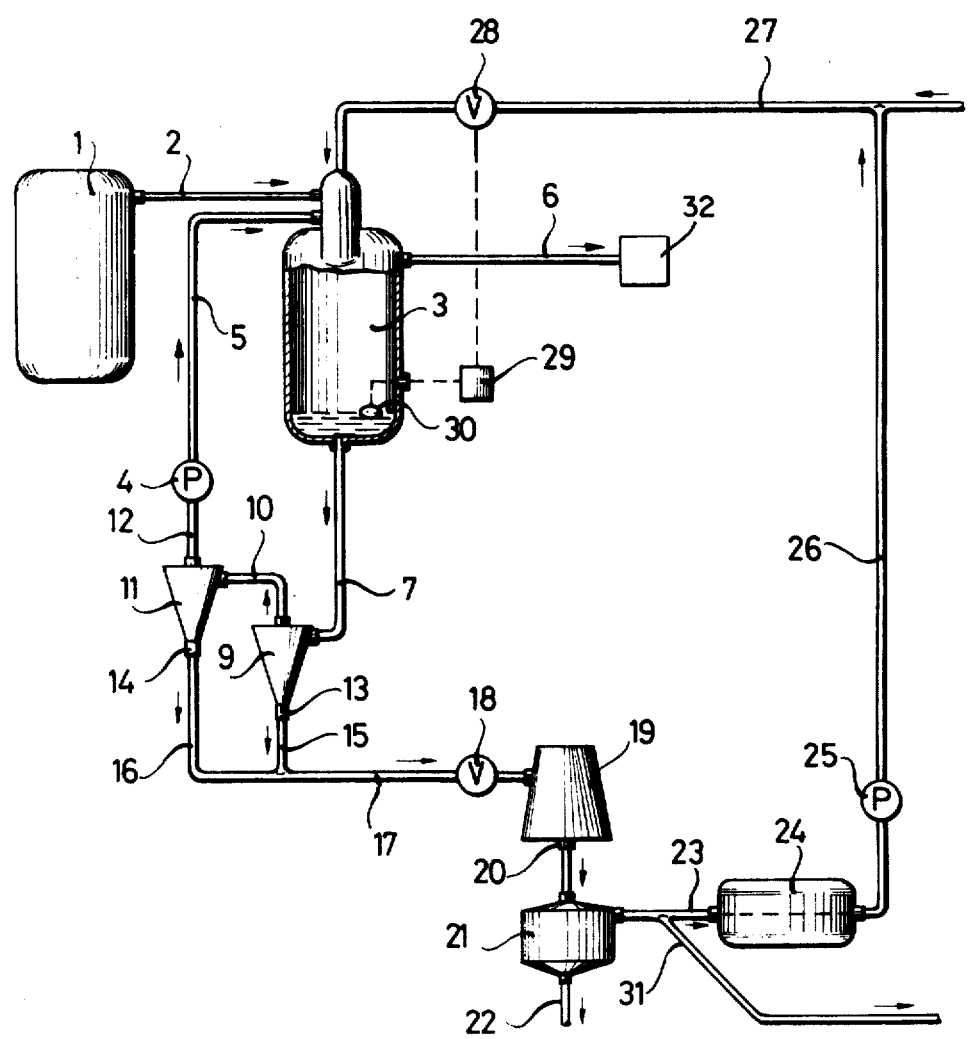

METHOD OF CLEANING GASES AND APPARATUS THEREFOR

BACKGROUND OF THE INVENTION

The invention relates to a method for cleaning gases, particularly those generated by the pressure gasification of coal.

These gases usually cleaned by treatment in a scrubbing unit or scrubbing-and-cooling unit with a scrubbing liquid particularly water, which is drawn off from the scrubbing-and-cooling unit and is fed back again to the unit in a closed circuit. A small portion of the water is usually tapped off and the impurities contained therein, in particular tar, dust and salts, are separated. This small portion of the water can, if required be fed back again to the scrubbing-and-cooling unit.

Such a method is known. It works on the recirculation principle. The gas generated in the gasification unit is fed to the scrubbing-and-cooling unit under pressure and drawn off from the unit after cleaning and cooling, as cold gas. The heat required for evaporating a portion of the circulated water is principally used for cooling the gas. Water vapour is thus led off with the cold gas. During the operation, the circulated water is enriched, particularly with tar and dust and the cleaning efficiency of the water is therefore restricted. Fine-scrubbing or washing units are therefore required, through which the cold gas is led before it is used, e.g. is burnt in a gas turbine.

In order to maintain the cleaning efficiency of the water, a part of it is usually continuously drawn off and fed through a pressure relieving unit into a tarseparator, which works on the sedimentation principle. The cleaned water is fed out of the tar-separator into a storage unit, from which it is fed, together with fresh water, which replaces the quantity of water evaporated, back to the scrubbing and cooling unit.

The tar-separator must be made very large so that during the sedimentation process the retention times required for the separation of the small tar and dust content in the water, are attained. The storage unit must also be made sufficiently large so that the method and apparatus can be adapted to varying load conditions.

In order to adapt to varying load conditions, regulating units are provided which control the water level in the scrubbing-and-cooling unit and in the storage unit, and also control quantity of water being drawn off from the re-cycled water.

Since these regulating units have to be coupled to one another, a comparatively large expenditure on regulating equipment is necessary.

Another disadvantage of the known method is the loss of energy which occurs in cleaning the drawn-off portion of the water. In order to clean this portion, which in some cases may be from 1 to 7% of the quantity of the re-cycled water, its pressure must be reduced. The energy released in this pressure reduction process is therefore lost.

It is also known to clean gases by the "runthrough" principle, which is also known under the name of the "Otto principle". In this method, only fresh water is fed to the scrubbing-and-cooling unit and the used water then flows away without cleaning. With this method admittedly the cleaning efficiency of the water is better than that achieved with the known recycling method, but this method is uneconomic in operation because of the large quantities of water which are required and which have to be cleaned up in order to protect the environment from pollution.

It is the object of the present invention to improve the gas cleaning efficiency achieved in the methods described above, and to reduce the cost of cleaning the water used in the cleaning process. Furthermore, the invention seeks to reduce the structural area required for the cleaning apparatus and to reduce the operating costs of the apparatus.

SUMMARY OF THE INVENTION

According to the present invention there is provided a method of cleaning gases to remove impurities therefrom in which gases are washed with a liquid in a scrubbing unit, and in which was liquid drawn off from said scrubbing unit is divided into a major portion and a minor portion, said major portion being recycled to said scrubbing unit and said minor portion being purified to remove impurities therefrom, the improvement which comprises purifying said wash liquid to remove impurities therefrom, concentrating said removed impurities into a concentrate stream and separating said removed impurities from said concentrate stream.

The present invention also provides an apparatus suitable for cleaning gases to remove impurities therefrom comprising a scrubbing unit, a wash liquid circulating means connected to said scrubbing unit for circulating wash liquid through said scrubbing unit, at least one cleaning appliance connected to said scrubbing unit for separating said wash liquid into a clean liquid stream and an impurities concentrate stream, and a separator unit connected to said at least one cleaning appliance for separating impurities from said impurities concentrate stream.

The method of the present invention has the advantage that the washing or scrubbing of the gas only takes place with cleaned water as in the run-through principle, but that the quantities of water required correspond to those used with the re-circulation method. It is possible, therefore, to obtain even better gas cleaning efficiencies, e.g. using pumps, which are reduced in a small circuit, so that waiting times and repair times occur less frequently and greater operational security is obtained.

At the same time the fraction of water which is drawn off from the re-cycled water, and which occurs as the concentrate, is reduced. The volume of this concentrate can be reduced to, for example, 1/25th of the fraction drawn off in the known re-cycling method, equal quantities of impurities being drawn off in each case. The pressure reduction losses are also reduced correspondingly. The tar-separator unit and the storage unit, if required, need only be designed for the quantities of concentrate actually present. This means, in the example given hereinbelow, a reduction in the constructional size of the apparatus of 4%. With very small quantities of water present in the concentrate, the arrangement of the storage unit and the pump connected thereto which feeds the cleaned water back into the scrubbing-and-cooling unit, can be completely dispensed with, particularly when all of the water recovered from the concentrate is required for de-salting the circuit. De-salting is the removal of salt-rich liquid from the system.

In this way, the regulation of the cleaning apparatus is also simplified, since only the water level in the scrubbing-and-cooling unit need be regulated by the feed of fresh water which is used to replace the evaporated or drawn-off quantities of water.

Preferably, the water re-cycled in the circuit should be cleaned in a multiplicity of stages, and the concentrate product should be drawn off. In this way improved cleaning efficiencies are obtained.

BRIEF DESCRIPTION OF THE DRAWINGS

In the accompanying drawing, the single FIGURE illustrates an apparatus for cleaning gases which have been generated by the pressurised gasification of coal.

DESCRIPTION OF THE PREFERRED EMBODIMENT

An apparatus in accordance with the invention for carrying out this method is characterised in that behind the scrubbing-and-cooling unit at least one cleaning stage is provided for the re-cycled water, each of which has a concentrate discharge member which is connected to a separator unit.

Each cleaning stage should preferably consist of a hydrocyclone, whose concentrate discharge member is connected to a common separator unit. Hydrocyclones have a comparatively small structural volume while at the same time providing good cleaning efficiency. They therefore make it possible to keep the whose apparatus small. Furthermore, with hydrocyclones a pressure loss occurs between their inlet and their concentrate discharge member, so that the pressure of the concentrate flowing away is less than that of the recycled water. In particular, with the arrangement of a multiplicity of hydrocyclones it is therefore possible to dispense with the provision of a separate pressure reducing unit for the concentrate.

Depending on the degree of purification desired for the re-cycled water, a plurality of hydrocyclones can be connected in series. If very large quantities of water have to be cleaned it is also possible to arrange a plurality of hydrocyclones connected in parallel.

An embodiment of the invention will be described in detail in the following description with reference to the accompanying drawing.

The gas generator 1 represented in the FIGURE, which is a pressurised coal gasification unit, generates about 38,000 Nm$^3$/h of crude gas at a temperature of about 550° C and at a pressure of about 20 atmospheres absolute pressure. The crude gas is led through pipe 2 into the upper part of scrubbing-and-cooling unit 3, in which the tar and dust constituents of the gas are washed out. In the scrubbing-and-cooling unit, the crude gas is treated with water which passes from pump 4 through pipe 5 into scrubbing-and-cooling unit 3. The pump conveys about 180 metric tons per hour of washing water into the scrubbing-and-cooling unit. The cleaned gas, cooled to a temperature of about 165° C, is drawn off as cold gas through pipe 6 and burnt e.g. in a gas turbine 32.

The water pumped into scrubbing-and-cooling unit 3 is collected in the lower part of the unit and led from there through pipe 7 into hydrocyclone 9, in which the water is freed from the tar and dust constituents. The cleaned water is led through pipe 10 into second hydrocyclone 11 connected to the first in series, in which the residual impurities are separated off from the water. Pump 4 sucks this cleaned water through a pipe 12 out of the hydrocyclone 11, so that the cleaning water circuit is completed in the shortest possible way.

Since pump 4 continuously pumps cleaned water around the circuit, impurities only remain for a short time inside the pump and in the parts of the apparatus connected thereto. The cleaned water thus has a satisfactory degree of absorbency for the tars and dust contained in the crude gas, so that additional fine-washers or scrubbers in pipe 6 for the cold gas are superfluous.

From hydrocyclones 9 and 11 a concentrate of water, tar and dust is led off from concentrate discharge members 13 and 14, from the hydrocyclones through pipes 15 and 16 connected thereto. Under the described conditions from about 0.2 to 0.3 metric tons per hour of tar and dust and also from 0.2–0.3 metric tons per hour of water are led off as concentrate. Pipes 15 and 16 feed the concentrate into collecting pipe 17 which is provided with shut-off member 18 and into pressure reducing member 19 in which the pressure of the concentrate is reduced to normal pressure.

From pressure reducing unit 19 the concentrate passes through pipe 20 into tar separating unit 21, which in this particular example works on the sedimentation principle. Because of the high tar and dust concentration in the concentrate and also because of the small proportion of water, it is possible to make the tar separator unit with only a small volume. The thick tar-rich stream is drawn off from tar separator unit 21 at 22, and the water recovered from the separator is led through pipe 23 into storage unit 24. From storage unit 24 the recovered water is pumped by means of pump 25 through pipe 26 into fresh water pipe 27, through which in this particular example from about 10 to 15 metric tons per hour of fresh water together with the water pumped from storage unit 24, are fed into scrubbing-and-cooling unit 3. The fresh water makes up the losses of re-cycled water which occur because of the water that is evaporated and entrained by the cold gas. The particular quantity of fresh water required is adjusted by means of shut-off member 28, which is actuated by regulator 29. Regulator 29 operates in response to the signal generated by water level indicator 30.

A portion of the water recovered from the concentrate is tapped off at 31 from pipe 23 for de-salting purposes. If the salt content of the water obtained from the concentrate is so high that the feeding back of this water into scrubbing-and-cooling unit 3, is undesirable, then the whole of the water recovered from the concentrate is de-salted. In this case, the provision of storage unit 24, pump 25 and pipe 26 can be dispensed with. The re-cycled quantity of water is then kept constant solely by the feed of fresh water.

We claim:

1. An apparatus suitable for cleaning gases generated by the pressurized gasification of coal by removing impurities of tar, dust and salts therefrom comprising:
   a pressurized coal gasification unit, generating a crude gas stream containing tar, dust and salts,
   a scrubbing unit connected to the coal gasification unit and receiving the crude gas stream containing tar, dust and salts and having means for contacting the crude gas stream with wash water,
   a plurality of hydrocyclones having their discharge members in a series and operably connected to said scrubbing unit for separating from said wash water, a concentrate stream containing said tar, dust and salts,
   a wash water pump operably connected to said scrubbing unit and to said discharge member of one of said hydrocyclones for circulating wash water through said scrubbing unit, and
   a sedimentation separating tank operably connected to the concentrate discharge members of said plurality of hydrocyclones for separating said tar, dust and salts from said concentrate stream.

2. A method of cleaning gases produced from the gasifying of coal to remove impurities therefrom comprising the steps of:
   A. gasifying coal in a pressurized coal gasification unit to produce hot pressurized gas,
   B. conveying the gas to a scrubbing and cooling unit,
   C. introducing wash water into the scrubbing and cooling unit to produce cleaned gas,
   wherein said wash water is composed of fresh water and recycled water, the recycled water coming from step F below,
   D. withdrawing the cleaned gas and conveying the gas to a gas turbine,
   E. conveying wash water from the scrubbing and cooling unit into at least one hydrocyclone to produce cleaned water and concentrate,
   F. conveying the cleaned water to the scrubbing and cooling unit,
   G. conveying the concentrate into a tar separating unit to separate the concentrate into a water stream and a tar stream,
   H. adjusting the quantity of wash water in response to the water level in the scrubbing and cooling unit.

3. A method of cleaning gases produced from the gasifying of coal to remove impurities therefrom comprising the steps of:
   A. gasifying coal in a pressurized coal gasification unit to produce crude gas at 550° C and 20 atmospheres of pressure,
   B. conveying the crude gas to the top of a scrubbing and cooling unit,
   C. introducing wash water into the scrubbing and cooling unit to produce cleaned crude gas,
   wherein said water is composed of fresh water, water recycled from hydrocyclones employed in step G and water recycled from the tar separator in Step I, below,
   D. withdrawing the cleaned crude gas and conveying the gas to a gas turbine,
   E. conveying water from the bottom of the scrubbing and cooling unit into a first hydrocyclone to produce cleaned water and concentrate,
   F. conveying the cleaned water into a second hydrocyclone to produce further cleaned water and a second concentrate,
   G. conveying the further cleaned water from the second hydrocyclone via a pump to the top of the scrubbing and cooling unit,
   H. conveying the concentrates of the first and second hydrocyclones to a pressure reducing unit to lower the pressure of the concentrates to atmospheric pressure,
   I. passing the concentrate from the first and second hydrocyclone into a tar separating unit to separate the concentrate from the first and second hydrocyclone into a water stream and a tar stream,
   J. conveying the water stream to a storage unit,
   K. pumping the water from the storage unit to the stream conveying fresh water to the scrubbing and cooling unit,
   L. adjusting the quantity of wash water added by means of a valve which is actuated by a regulator in response to a signal generated by a water level indicator in the scrubbing and cooling unit.

4. A method of cleaning gases produced from the gasifying of coal to remove impurities therefrom comprising the steps of:
   A. gasifying coal in a pressurized coal gasification unit to produce crude gas at 550° C and 20 atmospheres of pressure,
   B. conveying the crude gas to the top of a scrubbing and cooling unit,
   C. introducing wash water into the scrubbing and cooling unit to produce cleaned crude gas,
   wherein said water is composed of fresh water, water recycled from hydrocyclones employed in Step G below,
   D. withdrawing the cleaned crude gas and conveying the gas to a gas turbine,
   E. conveying water from the bottom of the scrubbing and cooling unit into a first hydrocyclone to produce cleaned water and concentrate,
   F. conveying the cleaned water into a second hydrocyclone to produce further cleaned water and a second concentrate,
   G. conveying the further cleaned water from the second hydrocyclone via a pump to the top of the scrubbing and cooling unit,
   H. conveying the concentrates of the first and second hydrocyclones to pressure reducing unit to lower the pressure of the concentrates to atmospheric pressure,
   I. conveying the concentrate from the first and second hydrocyclone into a tar separating unit to separate the concentrate from the first and second hydrocyclone into a water stream and a tar stream,
   J. removing the water stream from the tar separating unit,
   K. adjusting the quantity of wash water added by means of a valve which is actuated by a regulator in response to a signal generated by a water level indicator in the scrubbing and cooling unit.

* * * * *